(12) United States Patent
Beele (10) Patent No.: US 10,544,884 B2
(45) Date of Patent: *Jan. 28, 2020

(54) SEALING SYSTEM FOR AN ANNULAR SPACE

(71) Applicant: Beele Engineering B.V., Aalten (NL)

(72) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/424,306

(22) PCT Filed: Aug. 29, 2013

(86) PCT No.: PCT/EP2013/067891
§ 371 (c)(1),
(2) Date: Feb. 26, 2015

(87) PCT Pub. No.: WO2014/033211
PCT Pub. Date: Mar. 6, 2014

(65) Prior Publication Data
US 2015/0292649 A1 Oct. 15, 2015

(30) Foreign Application Priority Data
Aug. 30, 2012 (EP) .................................. 12182375

(51) Int. Cl.
*F16L 5/10* (2006.01)
*H02G 3/22* (2006.01)
(Continued)

(52) U.S. Cl.
CPC ............ *F16L 5/10* (2013.01); *H01R 13/5202* (2013.01); *H02G 3/22* (2013.01); *F16J 15/025* (2013.01); *F16L 17/025* (2013.01)

(58) Field of Classification Search
CPC . F16L 5/10; F16L 17/025; H02G 3/22; H02G 15/13; F16J 15/025
See application file for complete search history.

(56) References Cited

U.S. PATENT DOCUMENTS 2,032,492 A * 3/1936 Nathan ................. F16L 17/025
277/605
2,202,617 A 5/1940 Shook
(Continued)

FOREIGN PATENT DOCUMENTS

CA 2 325 183 A1 5/2001
CN 1147294 A 4/1997
(Continued)

OTHER PUBLICATIONS

U.S. Appl. No. 12/225,346, filed Sep. 19, 2008, Beele.
(Continued)

*Primary Examiner* — Nicholas L Foster
(74) *Attorney, Agent, or Firm* — Wolf, Greenfield & Sacks, P.C.

(57) ABSTRACT

A system for sealing an annular space between an inner wall of a tubular opening and one tube, cable or duct which extends through the tubular opening in the axial direction thereof, wherein the system comprises at least two segmental parts for forming a sealing plug in the annular space, each segmental part is made of an elastic material, each segmental part being provided with a small-diameter-end for facilitating insertion of the plug in the annular space and a large-diameter-end for positioning at the end of the tubular opening from which the segmental parts are inserted into the annular space, each segmental part further having a number of outer ribs spaced apart in a longitudinal direction for realizing, in use, circumferentially extending outer contact surfaces between the sealing plug and the inner wall of the opening, each segmental part further being provided with a (Continued)

number of inner ribs spaced apart in the longitudinal direction for realizing, in use, circumferentially extending inner contact surfaces which between the sealing plug and the tube, cable or duct.

19 Claims, 5 Drawing Sheets

(51) Int. Cl.
*H01R 13/52* (2006.01)
*F16L 17/025* (2006.01)
*F16J 15/02* (2006.01)

(56) References Cited

U.S. PATENT DOCUMENTS

| | | | |
|---|---|---|---|
| 2,271,777 A * | 2/1942 | Nathan | F16L 17/025 |
| | | | 277/607 |
| 2,354,919 A | 8/1944 | Elmer | |
| 2,355,742 A | 8/1944 | Morehouse | |
| 2,396,836 A | 3/1946 | Ellinwood | |
| 2,404,531 A | 7/1946 | Robertson | |
| 2,448,769 A | 9/1948 | Chamberlain | |
| 2,819,099 A | 1/1958 | Rittle | |
| 2,896,974 A | 7/1959 | Bush | |
| 3,016,722 A | 1/1962 | Batdorf | |
| 3,048,415 A * | 8/1962 | Shook | F16J 15/025 |
| | | | 277/615 |
| 3,067,425 A | 12/1962 | Colley | |
| 3,162,412 A | 12/1964 | McEntire | |
| 3,163,448 A | 12/1964 | Carl | |
| 3,165,324 A | 1/1965 | Zopfi | |
| 3,206,539 A | 9/1965 | Kelly | |
| 3,229,026 A | 1/1966 | Sulzer | |
| 3,331,914 A | 7/1967 | Kavinsky | |
| 3,352,212 A | 11/1967 | Read | |
| 3,489,440 A | 1/1970 | Brattberg | |
| 3,578,027 A | 5/1971 | Zopfi | |
| 3,580,988 A | 5/1971 | Orlowski et al. | |
| 3,702,193 A * | 11/1972 | Flegel | F16L 5/10 |
| | | | 277/607 |
| 3,731,448 A | 5/1973 | Leo | |
| 3,793,672 A | 2/1974 | Wetmore | |
| 3,811,711 A | 5/1974 | Tarkenton | |
| 3,827,704 A | 8/1974 | Gillemot et al. | |
| 3,893,919 A * | 7/1975 | Flegel | E04D 13/0409 |
| | | | 210/166 |
| 3,913,928 A | 10/1975 | Yamaguchi | |
| 4,061,344 A | 12/1977 | Bradley et al. | |
| 4,075,803 A | 2/1978 | Alesi | |
| 4,086,736 A | 5/1978 | Landrigan | |
| 4,245,445 A | 1/1981 | Heinen | |
| 4,293,138 A | 10/1981 | Swantee | |
| 4,361,721 A | 11/1982 | Massey | |
| 4,376,230 A | 3/1983 | Bargsten | |
| 4,385,777 A | 5/1983 | Logsdon | |
| 4,413,845 A | 11/1983 | Lawrence | |
| 4,419,535 A | 12/1983 | O'Hara | |
| 4,426,095 A | 1/1984 | Buttner | |
| 4,429,886 A | 2/1984 | Buttner | |
| 4,641,858 A | 2/1987 | Roux | |
| 4,664,421 A | 5/1987 | Jones | |
| 4,797,122 A | 1/1989 | Kuboi et al. | |
| 4,889,298 A | 12/1989 | Hauff | |
| 4,915,422 A | 4/1990 | Chacon et al. | |
| 4,919,372 A | 4/1990 | Twist et al. | |
| 4,998,896 A | 3/1991 | Lundergan | |
| 5,020,810 A | 6/1991 | Jobe | |
| 5,027,571 A | 7/1991 | Wolff | |
| 5,067,676 A | 11/1991 | Beele | |
| 5,108,060 A | 4/1992 | Beele | |
| 5,245,131 A | 9/1993 | Golden et al. | |
| 5,288,087 A | 2/1994 | Bertoldo | |
| 5,344,106 A | 9/1994 | Beele | |
| 5,377,939 A | 1/1995 | Kirma | |
| 5,456,050 A | 10/1995 | Ward | |
| 5,482,076 A | 1/1996 | Taylor et al. | |
| 5,493,068 A | 2/1996 | Klein et al. | |
| 5,611,706 A | 3/1997 | Makita et al. | |
| 5,649,712 A | 7/1997 | Ekholm | |
| 5,653,452 A | 8/1997 | Jarvenkyla | |
| 5,662,336 A | 9/1997 | Hayashi | |
| 5,927,725 A | 7/1999 | Tabata et al. | |
| 5,954,345 A | 9/1999 | Svoboda et al. | |
| 6,180,882 B1 | 1/2001 | Dinh | |
| 6,259,033 B1 | 7/2001 | Kassulat | |
| 6,343,412 B1 | 2/2002 | Stephenson | |
| 6,359,224 B1 | 3/2002 | Beele | |
| 6,431,215 B1 | 8/2002 | Hsu | |
| 6,494,463 B1 | 12/2002 | Rank | |
| 6,521,840 B1 | 2/2003 | Kreutz | |
| 6,575,430 B1 | 6/2003 | Smith | |
| 6,634,675 B2 | 10/2003 | Parkes | |
| 6,717,055 B2 | 4/2004 | Kato | |
| 6,862,852 B1 | 3/2005 | Beele | |
| 6,902,138 B2 | 6/2005 | Vantouroux | |
| 6,969,799 B2 | 11/2005 | Snyder | |
| 7,005,579 B2 | 2/2006 | Beele | |
| 7,186,929 B2 | 3/2007 | Cox et al. | |
| 7,249,971 B2 | 7/2007 | Burke et al. | |
| 7,288,730 B2 | 10/2007 | Habel et al. | |
| 7,299,823 B2 | 11/2007 | Smith | |
| 7,371,969 B2 | 5/2008 | Hedstrom | |
| 7,410,174 B2 | 8/2008 | Jones et al. | |
| 7,442,884 B2 | 10/2008 | Ball et al. | |
| 7,534,965 B1 | 5/2009 | Thompson | |
| 7,781,684 B2 | 8/2010 | Stuckmann et al. | |
| 7,802,798 B2 | 9/2010 | Beele | |
| 7,806,374 B1 | 10/2010 | Ehmann et al. | |
| 7,918,486 B2 | 4/2011 | Preisendorfer | |
| 8,262,094 B2 * | 9/2012 | Beele | F16L 5/10 |
| | | | 277/607 |
| 8,490,353 B2 | 7/2013 | Beele | |
| 8,541,698 B2 | 9/2013 | Perschon et al. | |
| 8,833,014 B2 | 9/2014 | Beele | |
| 9,528,636 B2 | 12/2016 | Beele | |
| 9,722,404 B2 * | 8/2017 | Beele | H02G 3/22 |
| 2002/0171207 A1 | 11/2002 | Torii | |
| 2004/0045233 A1 | 3/2004 | Beele | |
| 2004/0093814 A1 | 5/2004 | Cordts et al. | |
| 2004/0093815 A1 | 5/2004 | Cordts | |
| 2004/0168398 A1 | 9/2004 | Sakno et al. | |
| 2004/0231880 A1 | 11/2004 | Beele | |
| 2005/0179214 A1 | 8/2005 | Beele | |
| 2006/0053710 A1 | 3/2006 | Miller et al. | |
| 2007/0216110 A1 | 9/2007 | Stuckmann et al. | |
| 2007/0273107 A1 * | 11/2007 | Beele | F16L 5/10 |
| | | | 277/607 |
| 2008/0088128 A1 | 4/2008 | Staskal | |
| 2009/0130891 A1 | 5/2009 | Milton | |
| 2009/0218451 A1 | 9/2009 | Lundborg | |
| 2009/0315275 A1 * | 12/2009 | Beele | F16L 5/10 |
| | | | 277/626 |
| 2010/0059941 A1 * | 3/2010 | Beele | F16L 5/10 |
| | | | 277/606 |
| 2010/0326724 A1 | 12/2010 | Karlsson et al. | |
| 2011/0018210 A1 * | 1/2011 | Beele | F16L 5/10 |
| | | | 277/606 |
| 2013/0106060 A1 * | 5/2013 | Beele | F16L 5/10 |
| | | | 277/314 |
| 2013/0161913 A1 | 6/2013 | Beele | |
| 2013/0234405 A1 | 9/2013 | Beele | |
| 2016/0020592 A1 * | 1/2016 | Beele | H02G 3/22 |
| | | | 248/56 |

FOREIGN PATENT DOCUMENTS

| | | |
|---|---|---|
| CN | 1205068 A | 1/1999 |
| CN | 1286366 A | 3/2001 |
| CN | 1781001 A | 5/2006 |
| CN | 101506565 A | 8/2009 |
| DE | 2 203 370 | 8/1973 |

(56) References Cited

FOREIGN PATENT DOCUMENTS

| | | |
|---|---|---|
| DE | 34 43 284 A1 | 5/1986 |
| DE | 92 04 067 U1 | 7/1992 |
| DE | 92 06 312 U1 | 8/1992 |
| DE | 42 25 916 A1 | 2/1994 |
| DE | 200 02 216 U1 | 4/2000 |
| DE | 296 05 883 U1 | 5/2001 |
| DE | 201 03 786 U1 | 8/2001 |
| DE | 100 35 006 C1 | 3/2002 |
| DE | 202004017185 U1 | 3/2006 |
| DE | 102005002597 B3 | 8/2006 |
| DE | 20 2006 017 659 U1 | 8/2007 |
| DE | 20 2009 004 739 U1 | 7/2009 |
| EP | 0 102 876 A2 | 3/1984 |
| EP | 0 139 337 A2 | 5/1985 |
| EP | 0 139 337 A3 | 7/1986 |
| EP | 0 278 544 A1 | 8/1988 |
| EP | 0 795 712 A1 | 9/1997 |
| EP | 0 987 482 A2 | 3/2000 |
| EP | 1 022 834 A1 | 7/2000 |
| EP | 1 059 695 A2 | 12/2000 |
| EP | 1 101 992 A2 | 5/2001 |
| EP | 1 134 472 A2 | 9/2001 |
| EP | 1 617 517 A1 | 1/2006 |
| EP | 1 837 573 A1 | 9/2007 |
| EP | 1 892 448 A1 | 2/2008 |
| EP | 2 390 544 A1 | 11/2011 |
| EP | 2418410 A1 * 2/2012 ................ F16L 5/10 | |
| FR | 2 169 219 | 9/1973 |
| FR | 2 675 879 A1 | 10/1992 |
| GB | 916 461 | 1/1963 |
| GB | 1083451 A | 9/1967 |
| GB | 2 057 595 A | 4/1981 |
| GB | 2 171 139 A | 8/1986 |
| GB | 2 186 442 A | 8/1987 |
| GB | 2 221 736 A | 2/1990 |
| JP | 3-32272 A | 2/1991 |
| JP | H5-41868 A | 2/1993 |
| JP | H6-93372 A | 4/1994 |
| JP | 07-065661 A | 3/1995 |
| JP | 07-245029 A | 9/1995 |
| JP | H7-282894 A | 10/1995 |
| JP | 08-251768 A | 9/1996 |
| JP | 09-327111 A | 12/1997 |
| JP | 2006-514249 A | 4/2006 |
| NL | 1 023 687 C2 | 12/2004 |
| WO | WO 95/27165 A1 | 10/1995 |
| WO | WO 98/15764 A1 | 4/1998 |
| WO | WO 02/43212 A1 | 5/2002 |
| WO | WO 02/052187 A1 | 7/2002 |
| WO | WO 02/070939 A1 | 9/2002 |
| WO | WO 2004/111513 A1 | 12/2004 |
| WO | WO 2005/003615 A1 | 1/2005 |
| WO | WO 2007/028443 A1 | 3/2007 |
| WO | WO 2007/107342 A1 | 9/2007 |
| WO | WO 2007/139506 A1 | 12/2007 |
| WO | WO 2008/023058 A1 | 2/2008 |
| WO | WO 2010/086361 A2 | 8/2010 |
| WO | WO 2011/147490 A1 | 12/2011 |

OTHER PUBLICATIONS

U.S. Appl. No. 13/794,175, filed Mar. 11, 2013, Beele.
U.S. Appl. No. 13/699,189, filed Nov. 20, 2012, Beele.
U.S. Appl. No. 14/768,053, filed Aug. 14, 2015, Beele.
International Search Report and Written Opinion dated Oct. 1, 2013 in connection with International Application No. PCT/EP2013/067891.
International Preliminary Report on Patentability dated Nov. 5, 2014 in connection with Application No. PCT/EP2013/067891.

* cited by examiner

SEALING SYSTEM FOR AN ANNULAR SPACE

RELATED CASE INFORMATION

This application is a 371 U.S. National Stage Application of International Application No. PCT/EP2013/067891, filed on Aug. 29, 2013, which claims priority to European Application No. 12182375.1, filed on Aug. 30, 2012.

The invention is related to a system for sealing an annular space between an inner wall of a tubular opening and one tube, cable or duct which extends through the tubular opening in the axial direction thereof.

Such systems are well-known in the art. Examples thereof are described in WO 2004/111513, WO 2007/028443, WO 2007/107342 and WO 2008/023058, all from the present Applicant, and incorporated herein by reference.

Although these systems function satisfactorily, there is a continuous drive to further improve sealing systems and/or to provide sealing systems for special purposes.

The object of providing such an improved system, which ideally can very advantageously be used in special circumstances, is achieved by a system according to claim 1. Provided is a system for sealing an annular space between an inner wall of a tubular opening and one tube, cable or duct which extends through the tubular opening in the axial direction thereof. The system comprises at least two segmental parts for forming a sealing plug in the annular space. Each segmental part is made of an elastic material. Each segmental part is provided with a small-diameter-end for facilitating insertion of the plug in the annular space. Each segmental part is also provided with a large-diameter-end for positioning at the end of the tubular opening from which the segmental parts are inserted into the annular space. Each segmental part further has a number of outer ribs spaced apart in a longitudinal direction for realizing, in use, circumferentially extending outer contact surfaces between the sealing plug and the inner wall of the opening. Each segmental part is further provided with a number of inner ribs spaced apart in the longitudinal direction for realizing, in use, circumferentially extending inner contact surfaces between the sealing plug and the tube, cable or duct. At least one of the outer ribs and one of the inner ribs meet in uninserted state of the plug the following geometric condition:

the outer rib has in cross-section the shape of a sawtooth having a rising surface rising radially outwardly toward the large-diameter-end of the plug and having a falling surface with an angled inward bend for facilitating relative movement of parts of the falling surface on opposite sides of a pivotal point of the angled bend;
the inner rib has a top surface extending in circumferential direction and in longitudinal direction for forming one of the inner contact surfaces; and
an imaginary straight line extending in a transverse direction both coincides with the pivotal point of the angled bend and intersects the top surface.

This geometry has a surprising effect. When the plug is inserted into the annular space, the outer rib meeting the above condition bends toward the large-diameter-end and adopt as such the diameter of the inner wall of the tubular opening. On further inserting the sealing plug, the outer end of the rising surface of the outer rib slides along the inner wall and the inner wall of the tubular opening continues to impose its diameter as the maximum diameter of the outer rib. As a consequence of this bended state of the outer rib, elastic forces are introduced into the sealing plug. Without wishing to be bound by any theory, it is believed that the opposite sides of the pivotal point under these circumstances form a "loaded spring" so as to exert a force from the pivotal point in the direction of the imaginary central axis of the plug. As an inner rib, or more particularly a top surface meeting the above condition, is aligned with this spring-loaded outer rib, or in any case with the pivotal point, radially inwardly directed forces are applied to the top surface of the inner rib.

In use the advantages are thus as follows. The plug can easily be inserted as the outer rib easily bends so as to adopt the diameter of the inner wall of the tubular opening as their outermost diameter. Also the top surface of the inner rib allows for easy sliding of the segmental parts along the tube, cable or duct when the segmental parts are inserted into the annular space. Elastic forces are introduced as a result of the bending of the outer ribs in such a way that these, in turn, result in a radially inward pressing of the top surfaces of the inner ribs, therewith further tightening the sealing plug around a tube, cable or duct.

In an embodiment of a system according to the invention, a lower part of the falling surface between the pivotal point and an imaginary central axis of the plug includes an angle in a range of 30-60°, preferably a range of 40-50°, with the longitudinal direction. This provides for an optimal transfer of the elastic forces from the bent outer rib toward an inner rib which is radially in line with that outer rib.

In an embodiment of a system according to the invention, an upper part of the falling surface between the pivotal point and an apex of the sawtooth includes an angle in the range of 90-70° with a longitudinal direction. This allows for a relatively large bending of the outer rib, so that the "spring loading" can be optimal.

In an embodiment of a system according to the invention, the lower part of the falling surface has a length which is about 70 percent of the length of the top surface. As the forces are likely to be spread out inwardly in the radial direction, the length of the lower part of the falling surface can be smaller than the length of the top surface. A relatively small length of that lower part of the falling surface allows for a relatively large length of the upper part, which can then more easily bend. If the length of the lower part of the falling surface is much smaller than the length of the top surface, then the radially inwardly directed force is likely to be only effective at a part of the top surface, and not result in a good clamping of the tube, cable or duct. It is felt that 70 percent strikes a good balance here.

In an embodiment of a system according to the invention, an imaginary straight line extending in the transverse direction both coincides with an apex of the sawtooth and intersects the top surface. This assures that even the minimum bending of the outer rib can most efficiently be transformed into a force directed radially inwardly to the top surface of the inner rib.

In an embodiment of a system according to the invention, an imaginary straight line extending in a transverse direction both coincides with an upper part of the falling surface and intersects the top surface. Also this results in a most efficient transfer of a minimal bending of the outer rib to a force directed radially inwardly at the top surface of the inner rib.

In an embodiment of the system according to the invention, the rising surface includes along its entire surface a constant angle with a horizontal direction. This is particularly suitable for a plug which needs to close off an annular space, but where the pressure needed to remove the plug again from the tubular opening should not be too high.

In an embodiment of the system according to the invention, the first part of the rising surface adjoining the apex of the sawtooth is provided with a leveling with respect to a second part of the rising surface located further away from the apex, wherein the leveling includes with the longitudinal direction an angle that is greater than 0° and less than an angle included by the second part and the longitudinal direction. Such an embodiment is more advantageous in a situation where plugs should be able to sustain a high pressure before being pressed out of the tubular opening. The leveling allows for more frictional contact between the plug and the inner wall of the tubular opening, so that the plug will resist moving, even under very high pressures, particularly in a direction opposite the insertion direction.

In an embodiment of a system according to the invention, a meeting of the leveling and the second part of the rising surface located further away from the apex forms an angled outward bend located in the rising surface, wherein the angled outward bend in the rising surface is located further away from an imaginary central axis of the plug than the pivotal point of the angled inward bend located in the falling surface. In such an embodiment, the higher frictional contact between the outer ribs of the plug and the inner wall of the tubular opening is combined with more easily "spring-loading" the outer ribs so as to generate a force radially inwardly toward the inner ribs.

In an embodiment of a system according to the invention, the inner rib is on either side of the top surface further provided with a sloped surface which extends away from the top surface, wherein the slope of each sloped surface encloses an angle with a transverse direction of the segmental part such that the bending of the inner rib is substantially inhibited when the segmental part is inserted into the annular space. This ensures that there is very little friction between the outer surface of the tube, cable or duct and the segmental parts, when the segmental parts are inserted into the annular space.

The invention and further embodiments will be further explained on the basis of the following drawing in which.

In the drawing, like features are referred to by like references.

Figure 1:
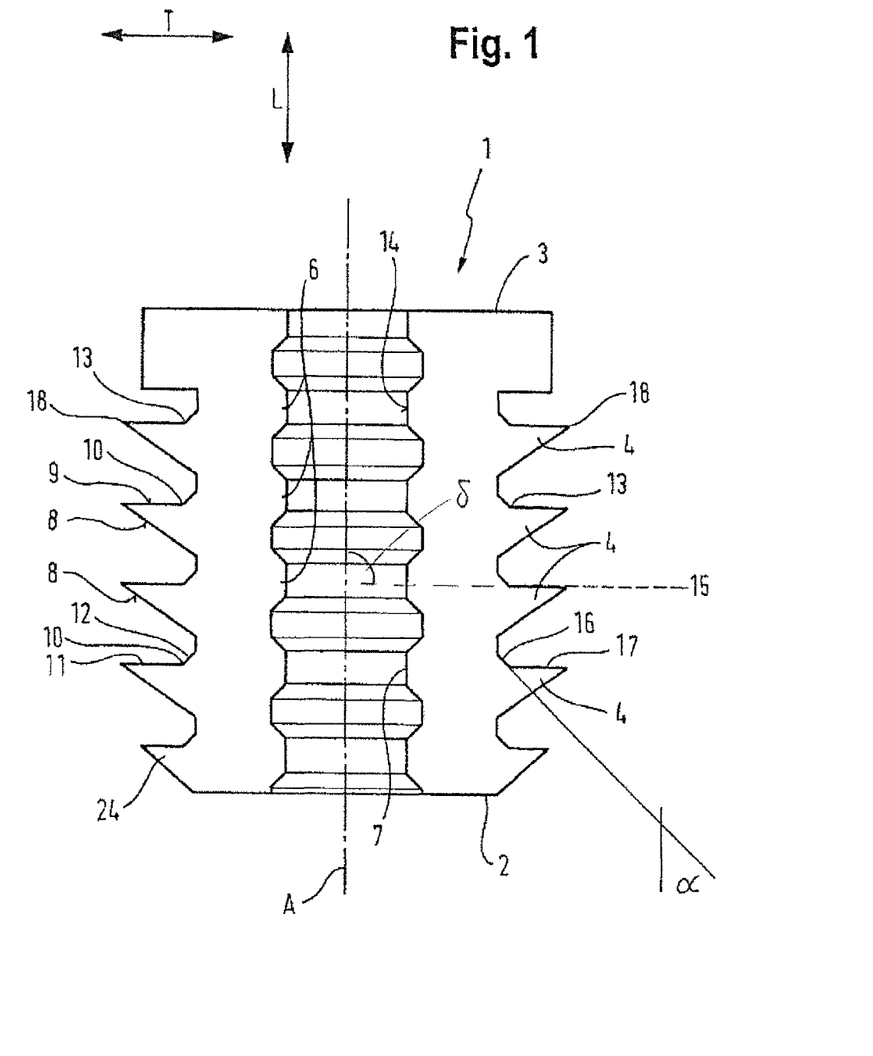
FIG. 1 shows in cross-sectional view a first embodiment of a system according to the invention.

FIG. 1 shows in cross-sectional view a first embodiment of a system for sealing an annular space between an inner wall of a tubular opening and one tube, cable or duct. The tubular opening can be the entrance of a pipe, a conduit sleeve as often found in partition walls in vessels or offshore constructions, but also a hole drilled or milled in a framework through which, for instance, electric cables extend, to enter a device, an installation, a building etc. In principle, there is no limitation to the type of tubular opening that can be sealed by a system according to the invention. The tube, cable or duct extending through the tubular opening in the axial direction thereof may have any purpose for which tubes, cables or ducts are usually applied. Liquids or gases may run through the tube, electrical signals or optical signals may be sent through the cable and the duct may, for instance, be used for covering fine optical fibres.

The system comprises at least two segmental parts 1 for forming a sealing plug in the annular space formed between the inner wall of the tubular opening and tube, cable or duct. Each segmental part 1 is provided with a small-diameter-end 2 for facilitating insertion of the plug in the annular space. Later on in this description, it will be explained how the small-diameter-end 2 may differ from other parts of the segmental part 1.

Each segmental part 1 is further provided with a large-diameter-end 3 for positioning at the end of the tubular opening from which the segmental parts 1 are inserted into the annular space. Each segmental part 1 further has a number of outer ribs 4 spaced apart in a longitudinal direction L for realizing, in use, outer contact surfaces 5 which extend in a circumferential direction between the sealing plug and the inner wall of the opening (see FIG. 2). Each segmental part 1 is further provided with a number of inner ribs 6 spaced apart in the longitudinal direction L for realizing, in use, inner contact surfaces 7 which extend in a circumferential direction between the sealing plug and the tube, cable or duct. At least one of the outer ribs 4 and one of the inner ribs 6 meet in uninserted state of the plug the following geometric condition:

the outer rib 4 has in cross-section the shape of a sawtooth having arising surface 8 rising radially outwardly toward the large-diameter-end 3 of the plug. The sawtooth further has a falling surface 9 with an angled inward bend 10 for facilitating relative movement of parts 11, 12 of the falling surface 9 on opposite sides of a pivotal point 13 of the angled bend 10;

the inner rib 6 has a top surface 14 extending in circumferential direction and a longitudinal direction L for forming one of the inner contact surfaces 7; and an imaginary straight line (dashed line 15) extending in a transverse direction T both coincides with a pivotal point 13 of the angle bend 10 and intersects the top surface 14.

Preferably, a lower part 16 of the falling surface 9 between the pivotal point 13 and an imaginary central axis A of the plug includes an angle α in a range of 30-60° with the longitudinal direction. Preferably, α is in the range of 40-50°. In a most suitable embodiment, α is 45°. An upper part 17 of the falling surface 9 between the pivotal point 13 and an apex 18 of the sawtooth, includes an angle of δ in the range of 90-70° with the longitudinal direction L. Preferably, lower part 16 of the falling surface 9 has a length which is about 70 percent of the length of the top surface 14 of an inner rib 6. As shown in the embodiment of FIG. 1, an imaginary straight line 15 extending in a transverse direction T both coincides with an apex 18 of the sawtooth and intersects the top surface 14. As also shown in the embodiment of FIG. 1, preferably an imaginary straight line 15 extending in a transverse direction T both coincides with an upper part 17 of the falling surface 9 and intersects the top surface 14. As shown, it is possible that the rising surface 8 includes along its entire surface a constant angle in longitudinal direction L.

Figure 6:
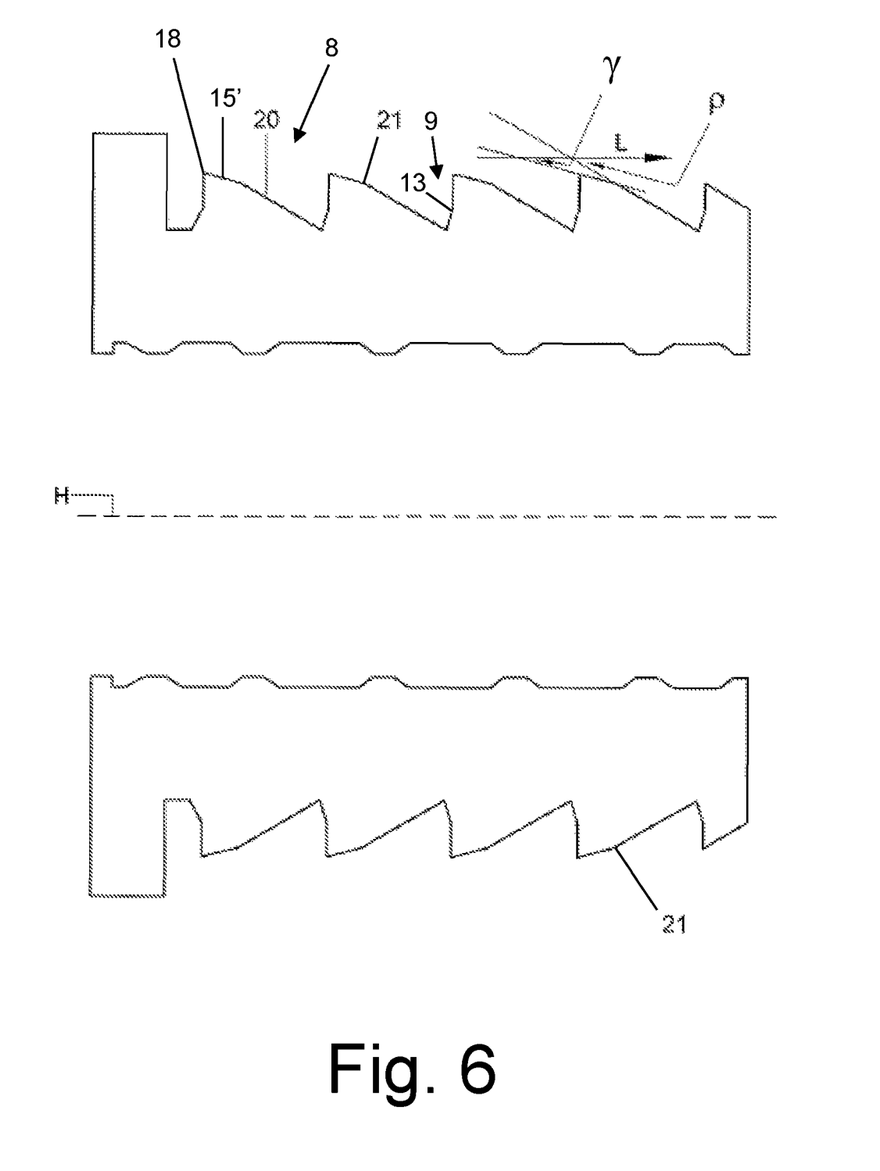
FIG. 6 shows a cross section of a longitudinal part of a system according to one embodiment.

However, in an alternative embodiment shown in FIG. 6, a first part of the rising surface 8 adjoining the apex 18 of the sawtooth is provided with a leveling 15' with respect to a second part 20 of the rising surface located further away from the apex 18. The leveling includes an angle γ with the longitudinal direction L that is greater than 0° and less than an angle ρ of the second part 20 with longitudinal direction L. WO 2004/111513 A1 shows in, for instance, FIGS. 1, 5, 6a and 6b, such a leveling, there referred to by reference sign 15. These Figures are as example of this alternative embodiment explicitly incorporated by reference.

In embodiments where such a leveling is applied, such as in FIG. 6, a meeting of the leveling 15' and the second part 20 of the rising surface 8 located further away from the apex 18 forms an angled outward bend 21 located in the rising surface 8. The angled outward bend 21 in the rising surface 8 is located further away from an imaginary central axis H of the plug than the pivotal point 13 of the angled inward bend located in the falling surface 9.

In any embodiment it is preferable that the inner rib 6 is on either side of the top surface 14 further provided with a sloped surface 22 which extends away from the top surface 14. The slope of each sloped surface 22 encloses an angle in a transverse direction T of the segmental part 1 such that bending of the inner rib 6 is substantially inhibited when the segmental part 1 is inserted into the annular space.

As shown, the inner ribs 6 are preferably in the longitudinal direction L positioned at a distance from each other. However, as shown in WO 2007/028443 A1, it is also possible to have the inner ribs adjacent each other.

Figure 2:
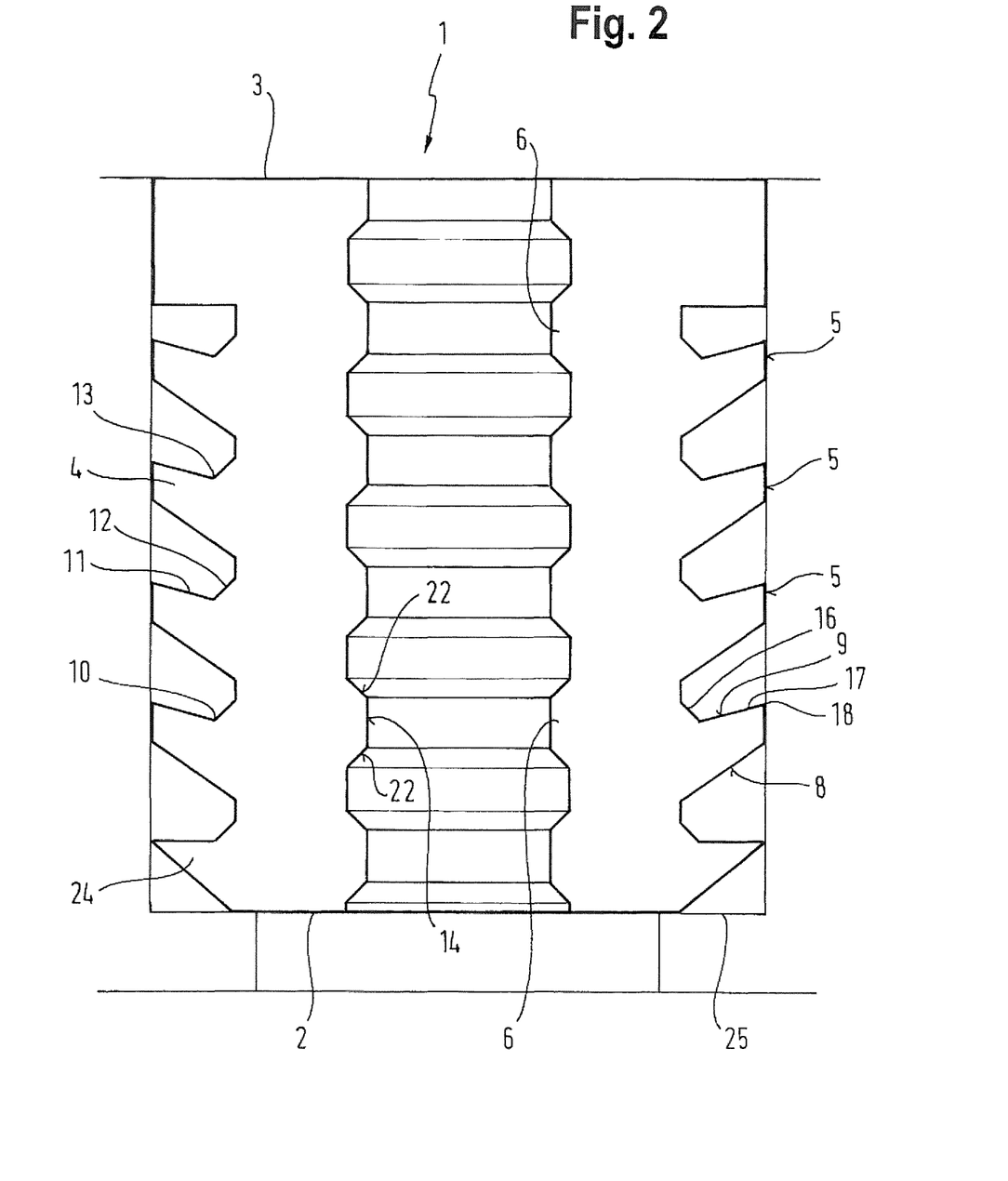
FIG. 2 shows schematically in cross-sectional view a first embodiment as inserted in a tubular opening.
Figure 3:
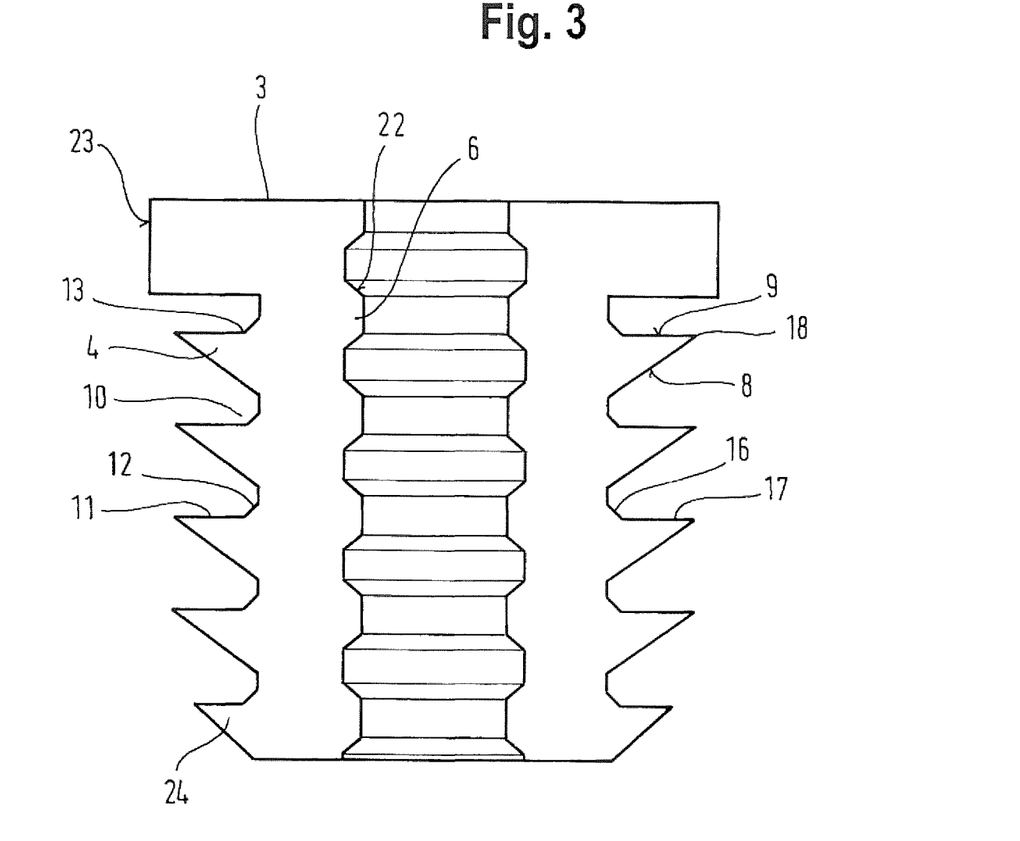
FIG. 3 shows in cross-sectional view the second embodiment of a system according to the invention.
Figure 4:
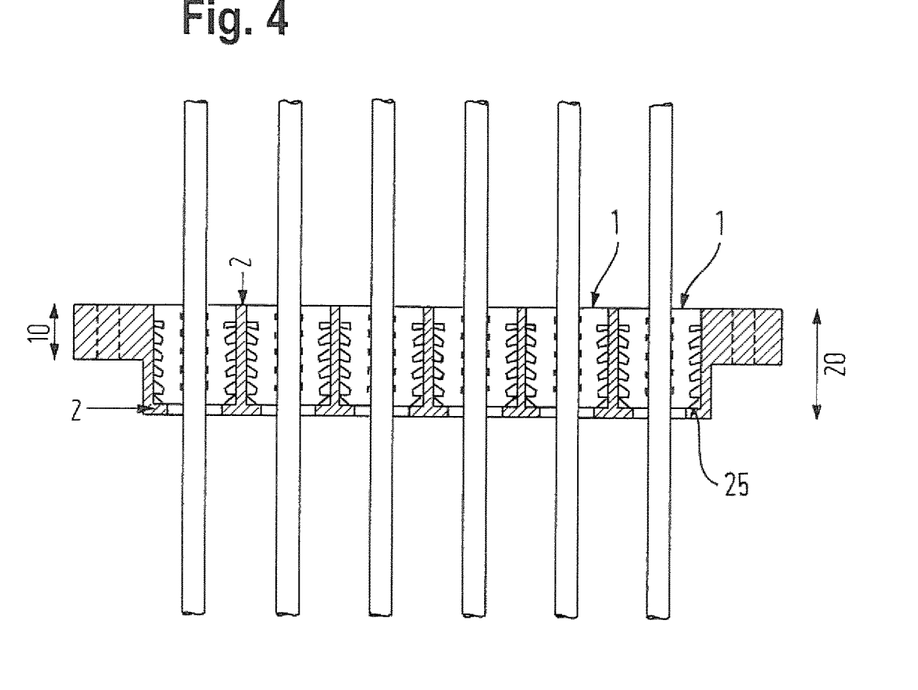
FIG. 4 shows in cross-sectional view a framework with tubular openings and the first embodiments of a system according to the invention for transit of electric cables or thin tubes.

FIG. 3 shows an alternative embodiment in which the large diameter-end 3 is provided with an outer flange 23 intended to be placed against an outer edge of the tubular opening. However, it is also possible, as shown in FIGS. 1, 2 and 4 that the large-diameter-end 3 is suitable for positioning in the end of the tubular opening. In the latter embodiment, the diameter of the outer ribs 4 is slightly larger than the diameter of the large-diameter-end 3. The diameter of the large-diameter-end 3 may correspond to the diameter of the inner wall of the tubular opening. For such an embodiment, the flange contributes to the stability of the plug in the opening.

As shown, four of the outer ribs 4 and four of the inner ribs meet in uninserted state of the plug the geometric condition specified above. Although the effect can already be achieved by application of the condition for one outer rib 4 and one inner rib 6, the overall sealing can be improved if this effect can be achieved at various positions along the longitudinal direction of the plug.

As also shown, particularly in FIGS. 1, 2 and 4, the first outer rib 24 at the small-diameter-end 2 has a smaller diameter than the other outer ribs 4. This diameter of the first outer rib 24 may deliberately be made a tiny bit larger than the diameter of the inner wall of the tubular opening. This facilitates an initial stage of insertion of the segmental part 1 as part of the plug. The first outer rib 24 can then easily be inserted and still contribute a little to the stability of the plug after insertion. Once the first outer rib 24 has been inserted, the remaining part of the plug can more easily be inserted when relatively large forces are applied in the longitudinal direction onto the large-diameter-end 3.

Segmental parts can be manufactured by molding a vulcanizable polymer material under such conditions so that vulcanization takes place. Ideally, the materials and the processing thereof is such that a rubber having a Shore A hardness of 70-74 is produced in the form of the segmental part. These processes can easily be controlled by those skilled in the art.

As shown in FIGS. 2 and 4, the segmental parts 1 can upon insertion in the tubular opening be placed against a shoulder 25 positioned in the tubular opening. The shoulder not only prevents the duct from being pressed out at the end of the opening opposite the end at which insertion took place, it also allows for a dynamic response of the plug in a situation where high pressure is applied against the large-diameter-end 3 of the plug. This dynamic effect is further described in WO 2008/023058 A1 as well as in WO 2007/107342.

It has turned out that the plugs as shown in the drawing operate very well for building a water-tight transit of electric cables. The plugs are easily inserted in the tubular openings as for instance shown above in FIG. 5. the tightness of both the plug and the electric cables improves within the first 24 hours after forming the sealing system in the tubular opening around the electric cable. The sealing system can very easily be applied and does not need tightening of screws etc. Only the frame needs to be fixed, possibly by screws. As such, labor costs can be reduced and management of parts becomes easier and straightforward.

Figure 5:
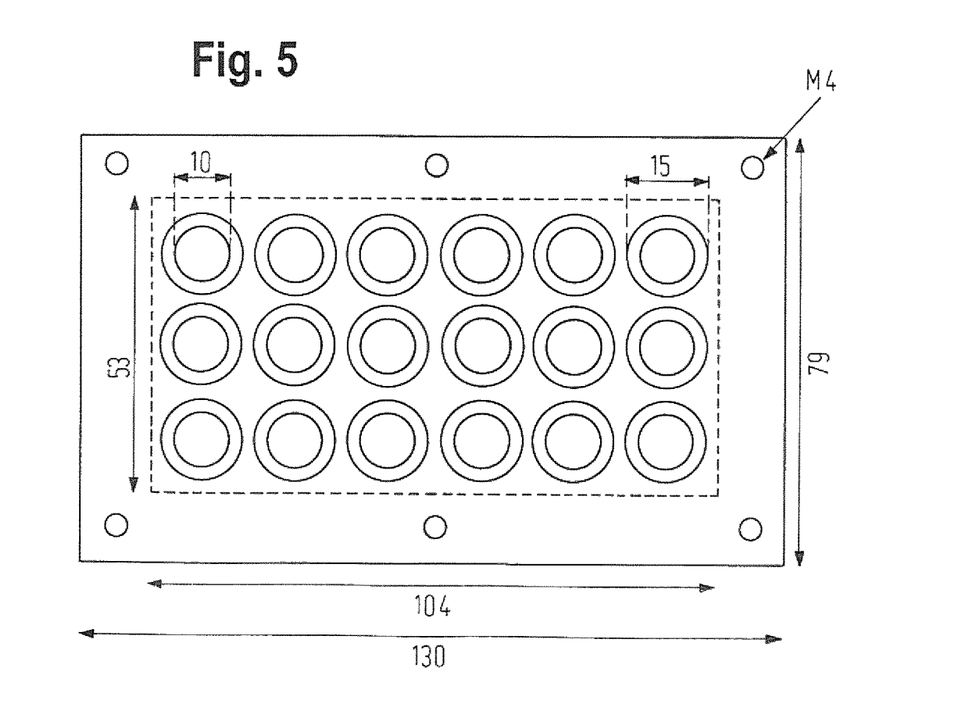
FIG. 5 shows a top view of the framework shown in FIG. 4.

The present invention is not limited to the embodiments shown and described herein. For instance, the annular space to be sealed may partly be occupied by other cables, ducts or tubes. The segmental parts may accommodate for that in a fashion, as for instance shown in FIGS. 4a-4e of NO 2004/111513. The present invention can be for any system, also for relatively small tubular openings and thin cables or tubes. Note that FIGS. 4 and 5 are not scaled up or down. That embodiment is suitable for sealing tubular openings with a 15 mm diameter through which cables with a 4-5 mm diameter extend. Interestingly, when a great effort is made to move the cable or tube by pulling or pushing it in the axial direction, it will indeed at some point in time move in the axial direction. However, the plug remains in position in the tubular opening. This can be very advantageous certain applications.

Many variations and modifications are possible without departing from the invention as defined by the appended claims.

The invention claimed is:
1. A system for sealing an annular space between an inner wall of a tubular opening and one tube, cable or duct which extends through the tubular opening in an axial direction thereof, wherein the system comprises:
   at least two segmental parts for forming a sealing plug in the annular space,
   each segmental part is made of an elastic material,
   each segmental part being provided with a small-diameter-end for facilitating insertion of the sealing plug in the annular space and a large-diameter-end for positioning at an end of the tubular opening from which the segmental parts are inserted into the annular space,
   the sealing plug having an axis running in a longitudinal direction,
   each segmental part further having a number of outer ribs spaced apart in the longitudinal direction for defining, in use, outer contact surfaces that extend in a circumferential direction around the sealing plug axis between the sealing plug and the inner wall of the opening,
   the circumferential direction being substantially perpendicular to the longitudinal direction,
   each segmental part further being provided with a number of inner ribs spaced apart in the longitudinal direction for defining, in use, inner contact surfaces that extend in the circumferential direction around the sealing plug axis between the sealing plug and the tube, cable or duct,
   wherein at least one of the outer ribs and at least one of the inner ribs meet, in an uninserted state of the sealing plug, the following geometric conditions:

the at least one outer rib has, in cross-section, a shape of a sawtooth having a rising surface rising radially outwardly toward the large-diameter-end of the sealing plug and having a falling surface with an angled inward bend for facilitating relative movement of parts of the falling surface on opposite sides of a pivotal point of the angled inward bend;

the at least one inner rib has a top surface that is a substantially cylindrical surface extending in the longitudinal direction and in the circumferential direction around the sealing plug axis for forming one of the inner contact surfaces; and the pivotal point of the angled inward bend is positioned relative to the top surface such that a straight line extending in a transverse direction can both coincide with the pivotal point of the angled inward bend and intersect the top surface, the transverse direction being substantially perpendicular to the longitudinal direction.

2. The system according to claim 1, wherein a lower part of the falling surface between the pivotal point and a central axis of the sealing plug includes an angle in a range of 30-60 degrees with the longitudinal direction.

3. The system according to claim 1, wherein an upper part of the falling surface between the pivotal point and an apex of the sawtooth includes an angle in the range of 90-70 degrees with the longitudinal direction.

4. The system according to claim 1, wherein a lower part of the falling surface has a length which is about 70% of a length of the top surface.

5. The system according to claim 1, wherein an apex of the sawtooth is positioned relative to the top surface such that a straight line extending in the transverse direction can both coincide with the apex of the sawtooth and intersect the top surface.

6. The system according to claim 1, wherein an upper part of the falling surface is positioned relative to the top surface such that a straight line extending in the transverse direction can both coincide with the upper part of the falling surface and intersect the top surface.

7. The system according to claim 1, wherein the rising surface includes, along its entire surface, a constant angle with the longitudinal direction.

8. The system according to claim 1, wherein the at least one inner rib is, on either side of the top surface, further provided with a sloped surface which extends away from the top surface, and wherein a slope of each sloped surface encloses an angle with the transverse direction such that bending of the inner rib is substantially inhibited when the segmental part is inserted into the annular space.

9. The system according to claim 1, wherein the inner ribs are, in the longitudinal direction, positioned at a distance from each other.

10. The system according to claim 1, wherein the large-diameter-end is provided with an outer flange intended to be placed against an outer edge of the tubular opening.

11. The system according to claim 1, wherein the large-diameter-end is suitable for positioning in the end of the tubular opening and wherein diameters of the outer ribs are slightly larger than a diameter of the large-diameter-end.

12. The system according to claim 1, wherein at least three of the outer ribs and three of the inner ribs meet, in the uninserted state of the sealing plug, the geometric conditions.

13. The system according to claim 1, wherein each of the segmental parts is made of a rubber.

14. The system according to claim 2, wherein an upper part of the falling surface between the pivotal point and an apex of the sawtooth includes an angle in the range of 90-70 degrees with the longitudinal direction.

15. The system according to claim 2, wherein the lower part of the falling surface has a length which is about 70% of a length of the top surface.

16. The system according to claim 3, wherein a lower part of the falling surface has a length which is about 70% of a length of the top surface.

17. The system according to claim 2, wherein the range is 40-50 degrees.

18. The system according to claim 13, wherein the rubber has a Shore A hardness of between 70-74.

19. A system for sealing an annular space between an inner wall of a tubular opening and one tube, cable or duct which extends through the tubular opening in an axial direction thereof, wherein the system comprises:

at least two segmental parts for forming a sealing plug in the annular space, each segmental part is made of an elastic material, each segmental part being provided with a small-diameter-end for facilitating insertion of the sealing plug in the annular space and a large-diameter-end for positioning at an end of the tubular opening from which the segmental parts are inserted into the annular space, the sealing plug having an axis running in a longitudinal direction, each segmental part further having a number of outer ribs spaced apart in the longitudinal direction for defining, in use, outer contact surfaces that extend in a circumferential direction around the sealing plug axis between the sealing plug and the inner wall of the opening, the circumferential direction being substantially perpendicular to the longitudinal direction, each segmental part further being provided with a number of inner ribs spaced apart in the longitudinal direction for defining, in use, inner contact surfaces that extend in the circumferential direction around the sealing plug axis between the sealing plug and the tube, cable or duct, wherein at least one of the outer ribs and at least one of the inner ribs meet, in an uninserted state of the sealing plug, the following geometric conditions:

the at least one outer rib has, in cross-section, a shape of a sawtooth having a rising surface rising radially outwardly toward the large-diameter-end of the sealing plug and having a falling surface with an angled inward bend for facilitating relative movement of parts of the falling surface on opposite sides of a pivotal point of the angled inward bend;

the at least one inner rib has a top surface that is a radially innermost substantially cylindrical surface of the plug extending in the longitudinal direction and in the circumferential direction around the sealing plug axis for forming one of the inner contact surfaces; and the pivotal point of the angled inward bend is positioned relative to the top surface such that a straight line extending in a transverse direction can both coincide with the pivotal point of the angled inward bend and intersect the top surface, the transverse direction being substantially perpendicular to the longitudinal direction.

* * * * *